Oct. 6, 1936.     J. E. LOVELY     2,056,792
LATHE AND THE LIKE SPEED CONTROL MECHANISM
Filed Aug. 7, 1934     13 Sheets-Sheet 1
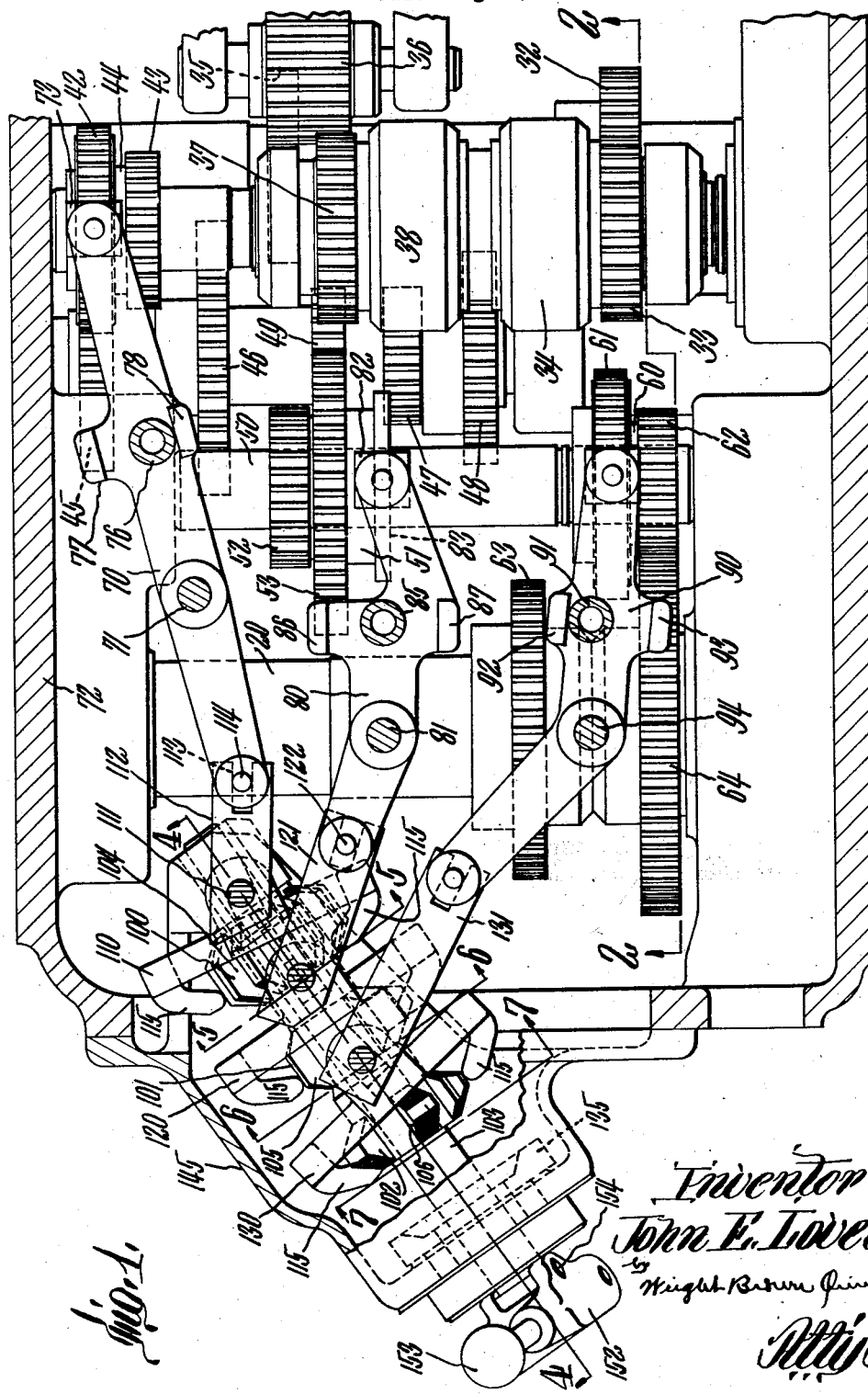
Inventor
John E. Lovely

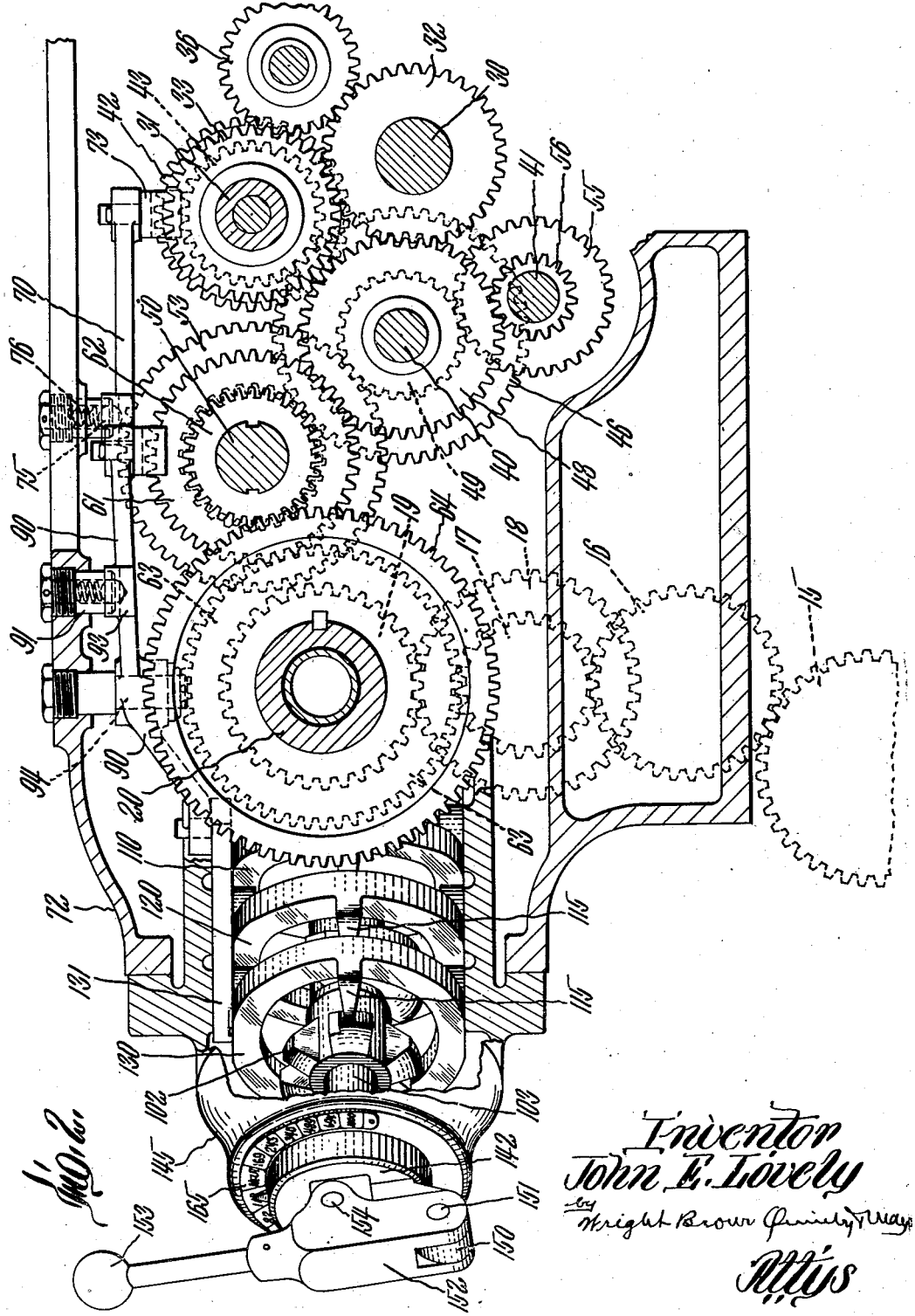

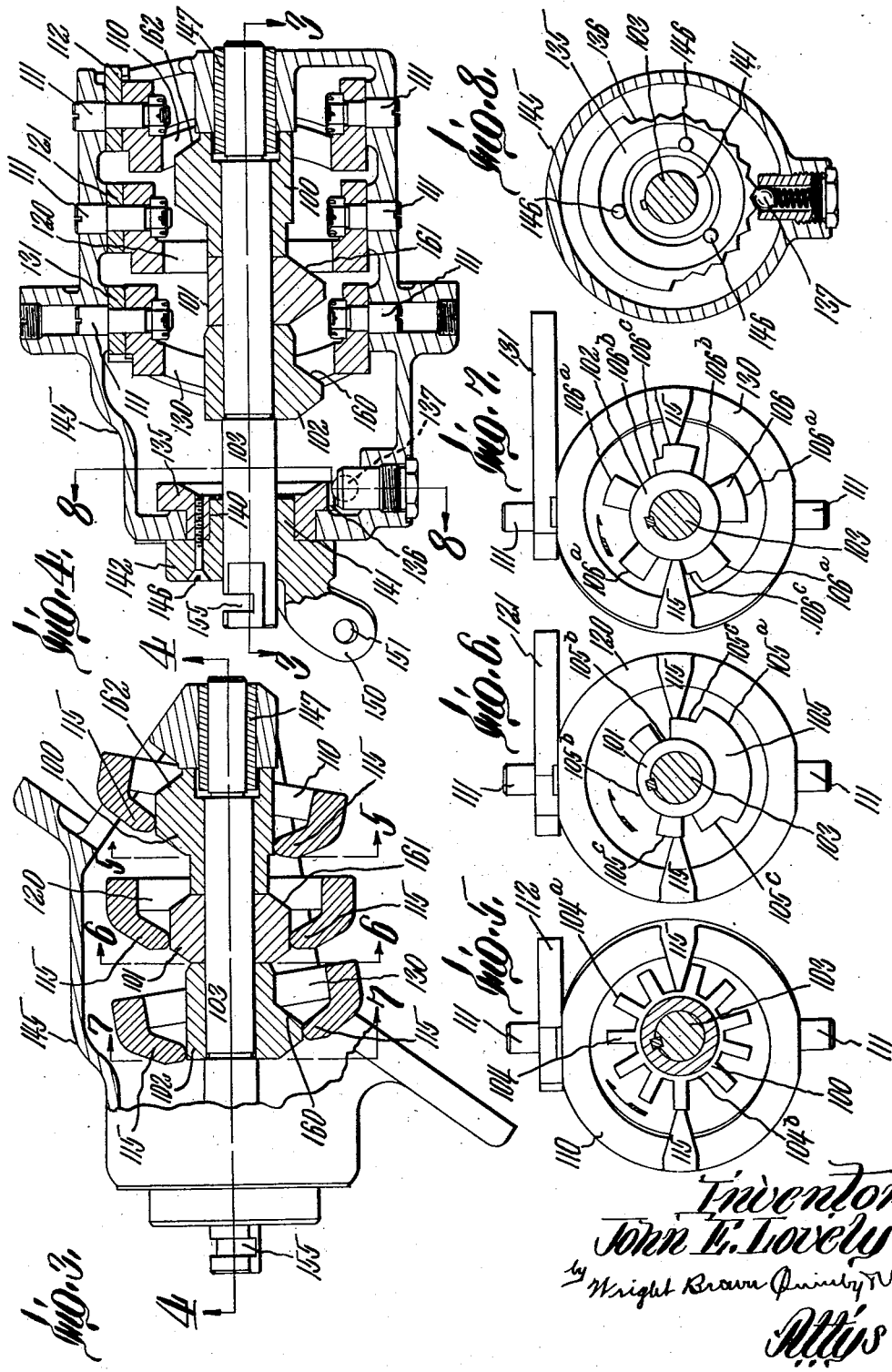

Oct. 6, 1936.   J. E. LOVELY   2,056,792
LATHE AND THE LIKE SPEED CONTROL MECHANISM
Filed Aug. 7, 1934   13 Sheets-Sheet 4
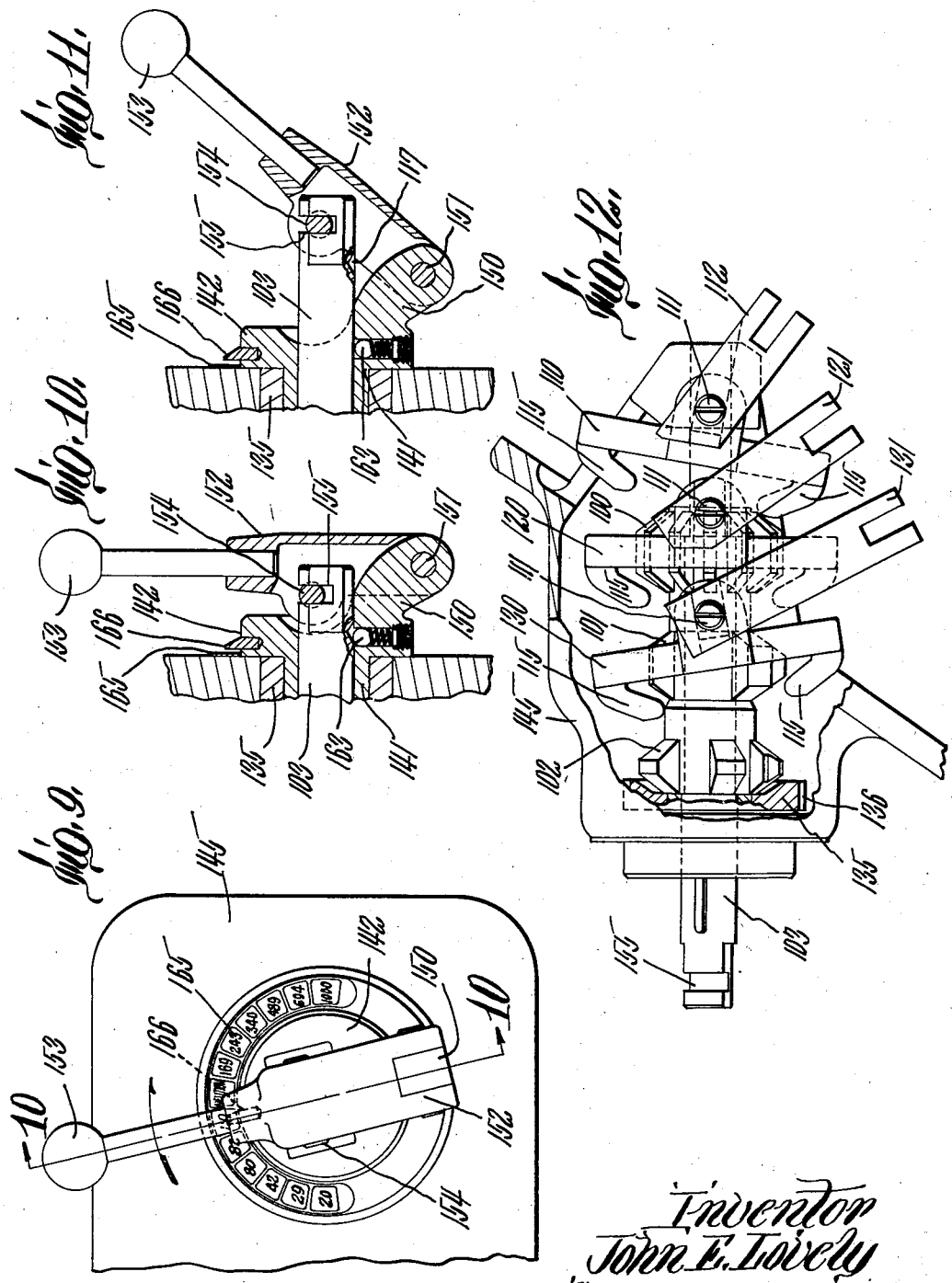
Inventor
John E. Lovely
by Wright Brown Quinby & May
Attys

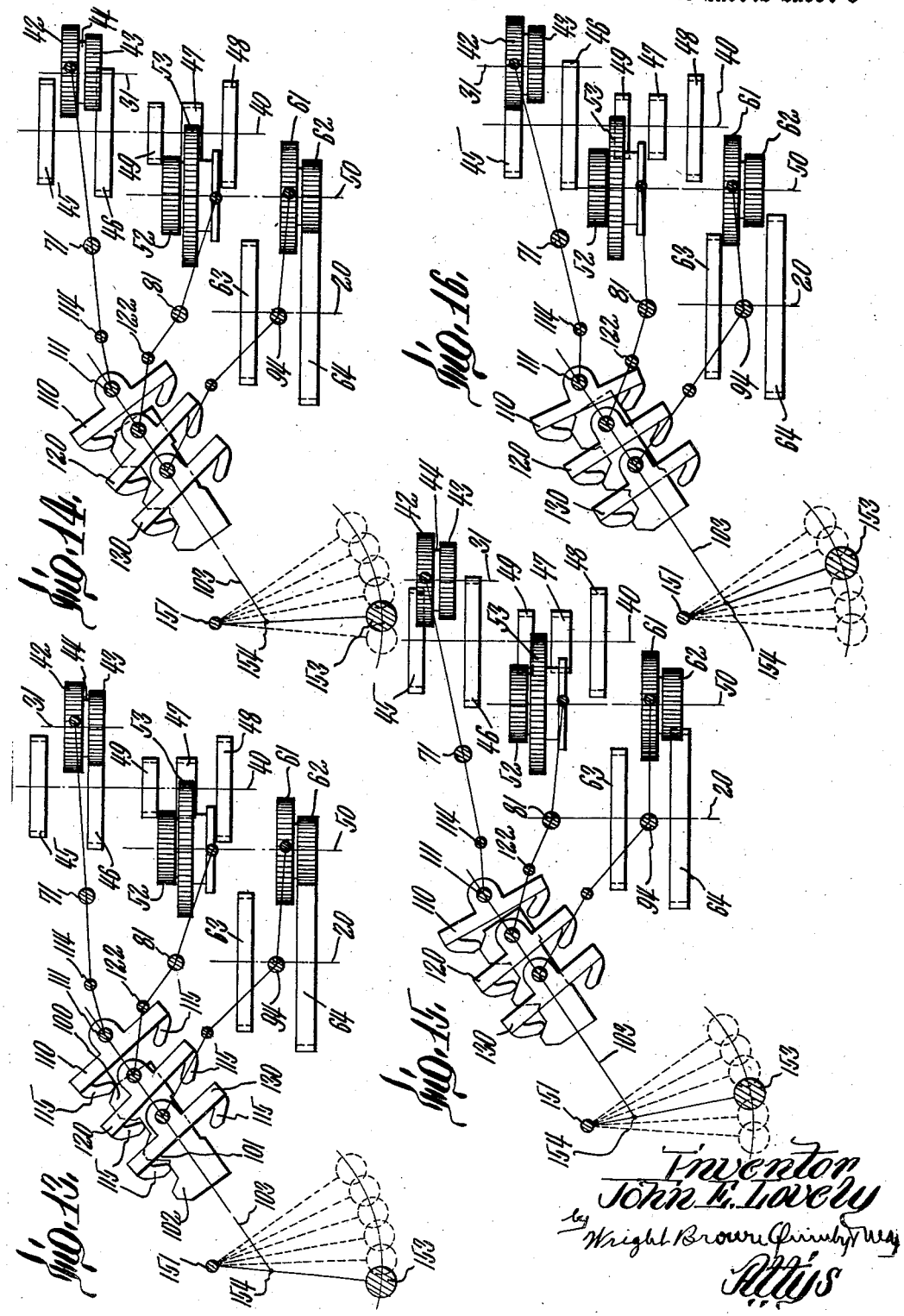

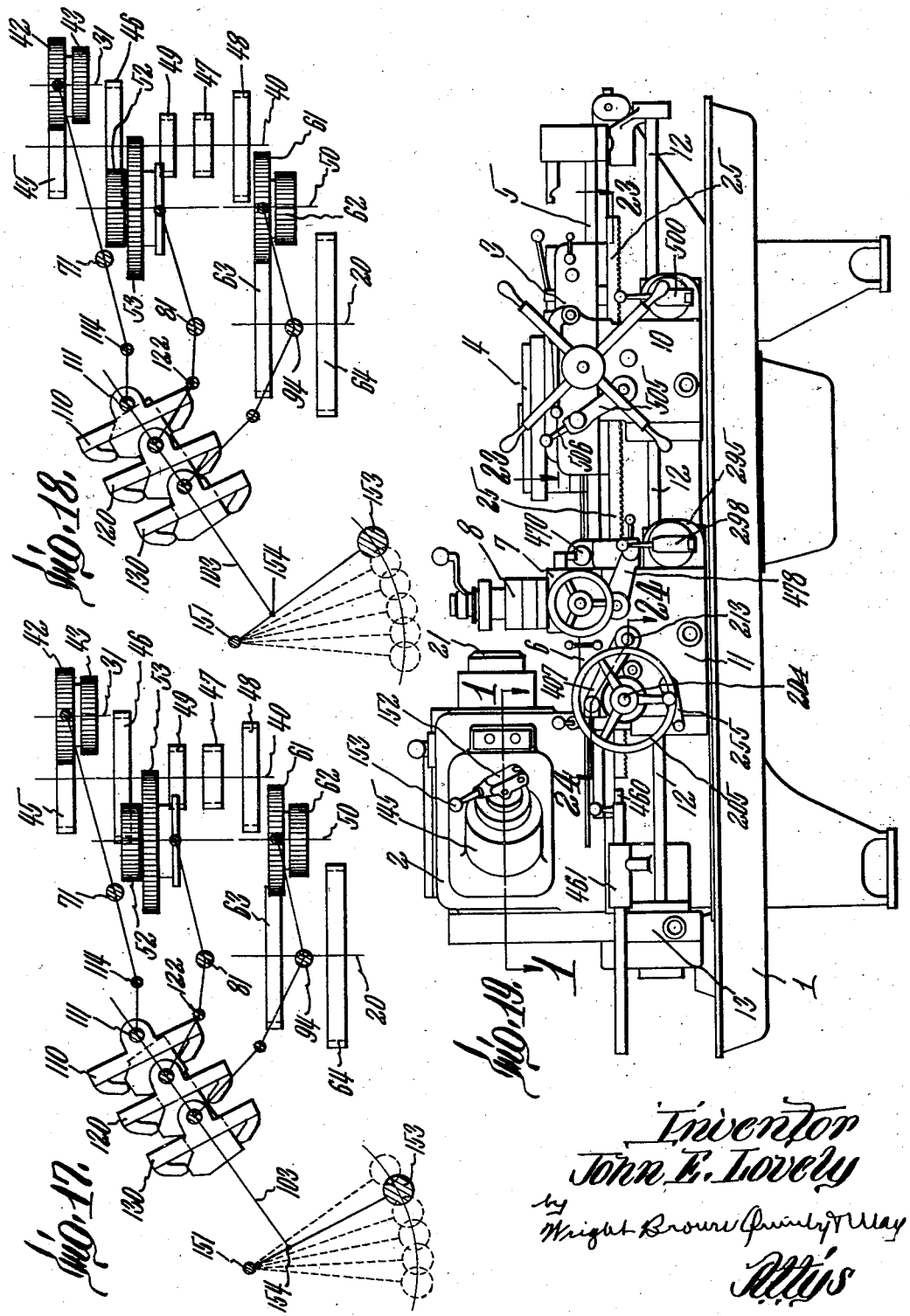

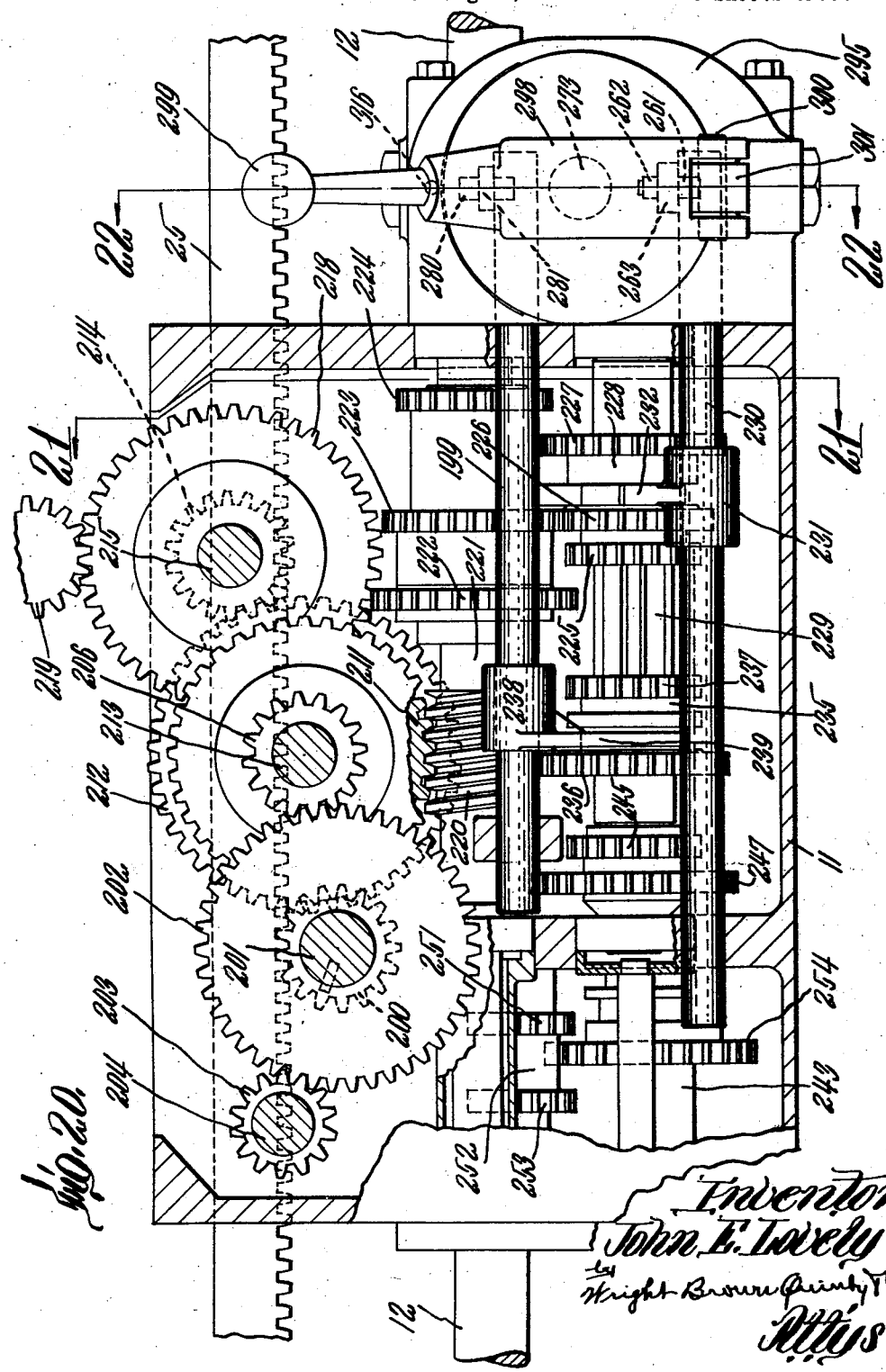

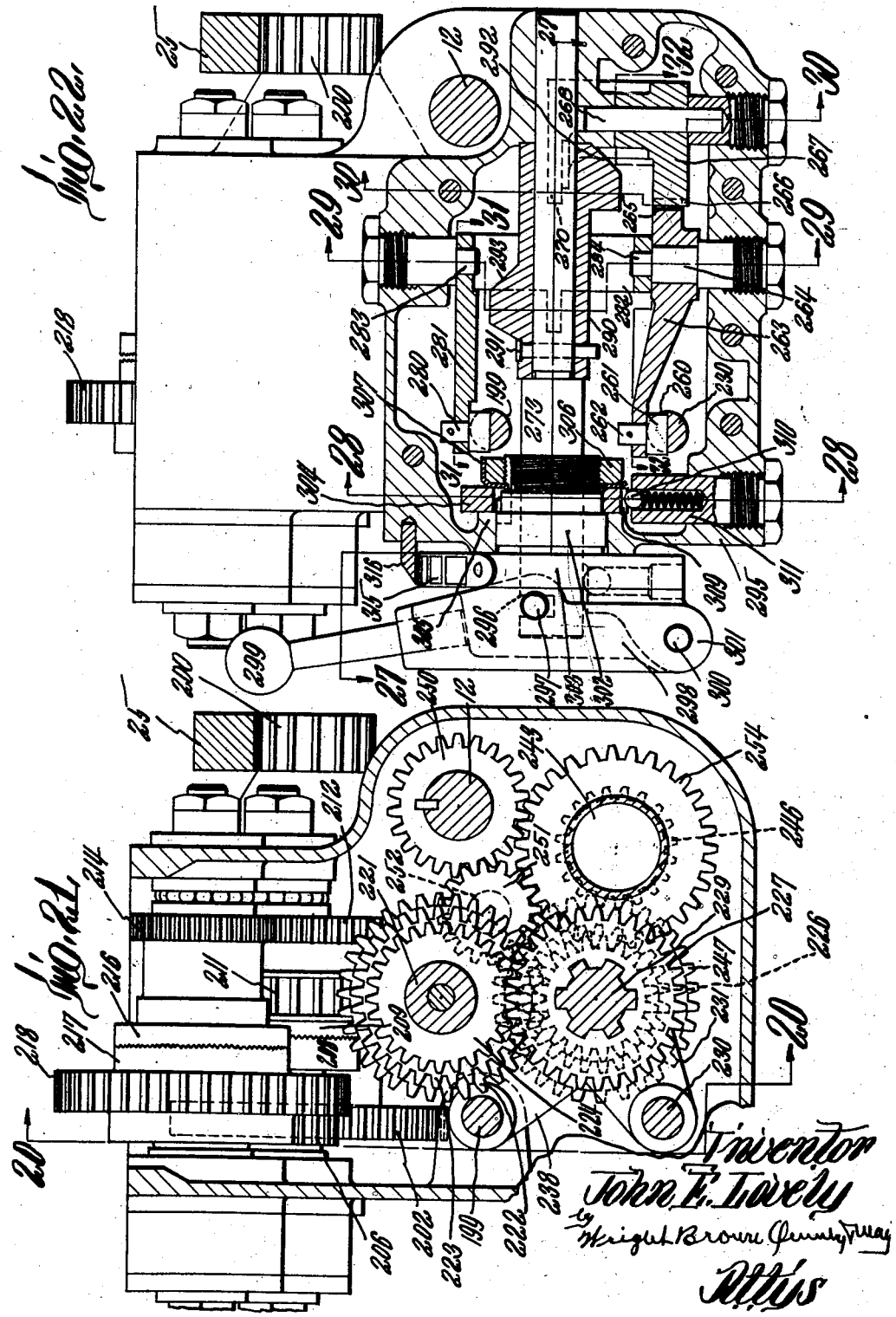

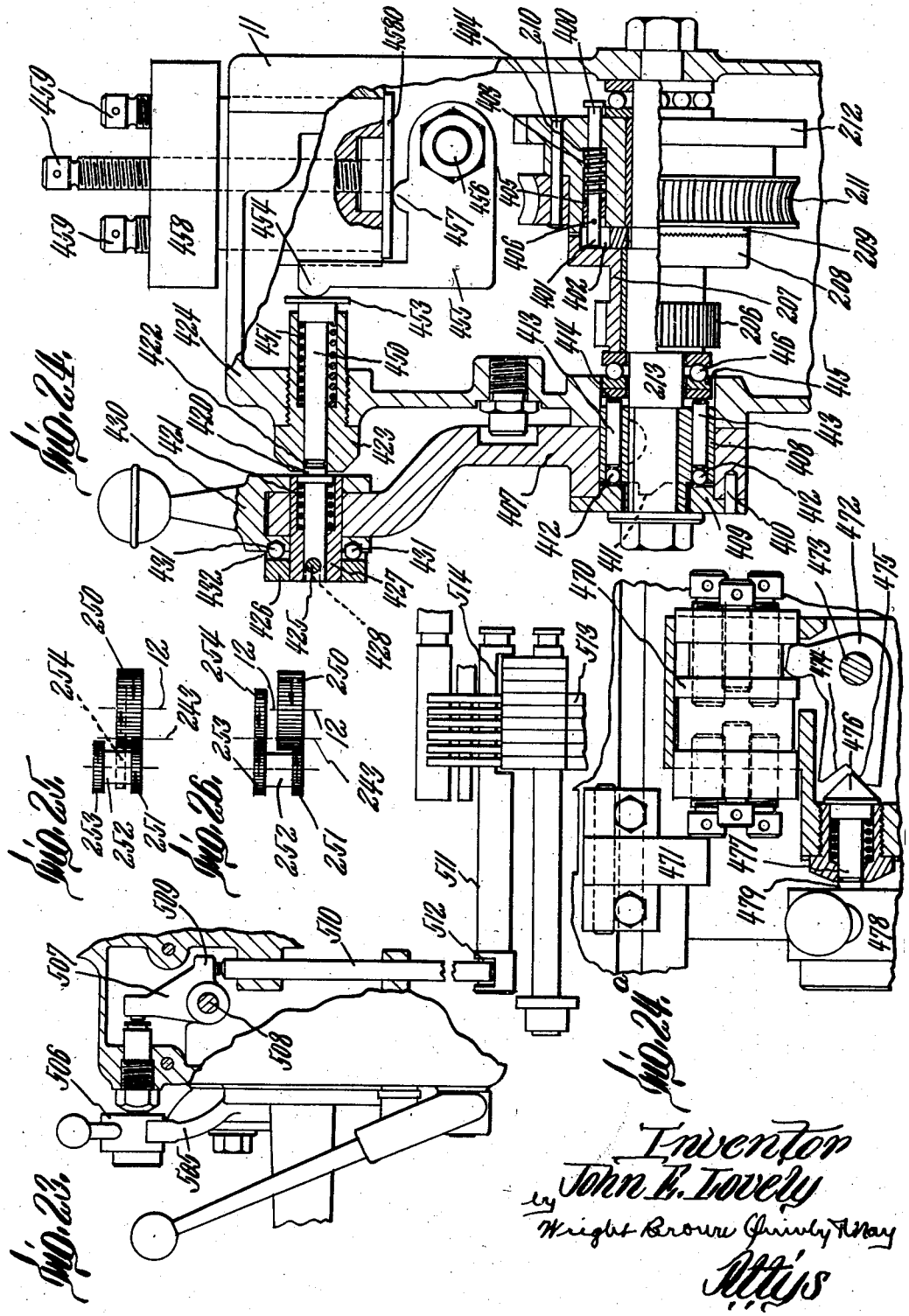

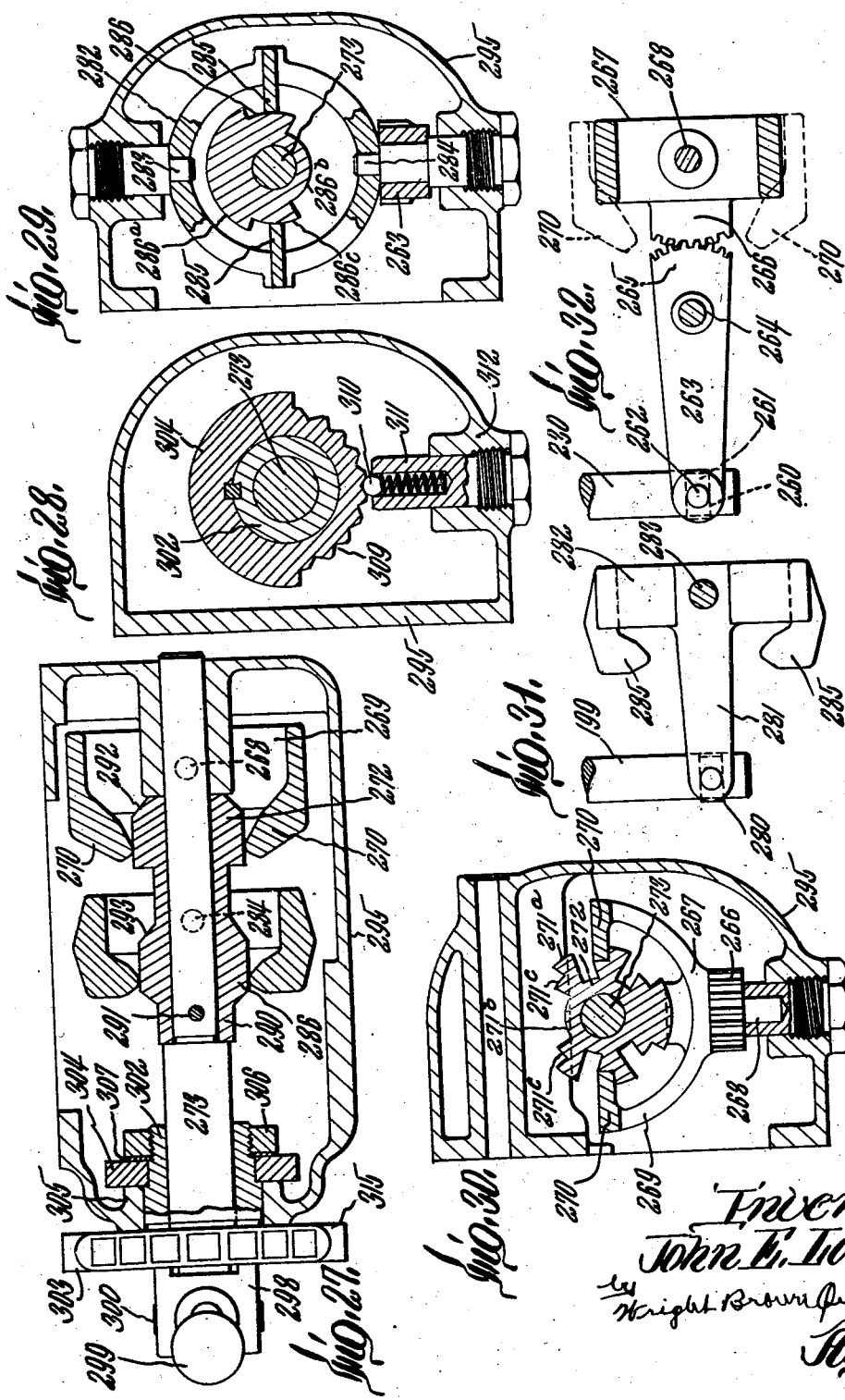

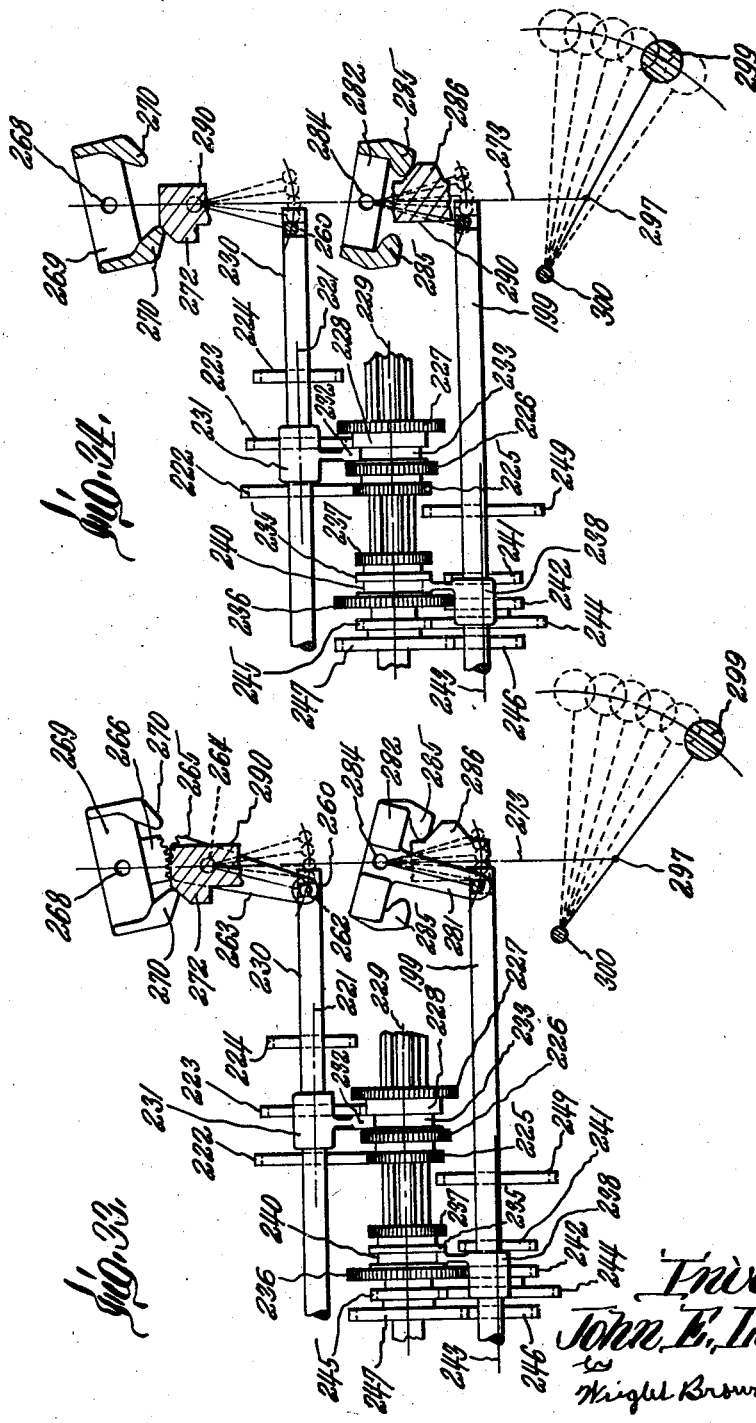

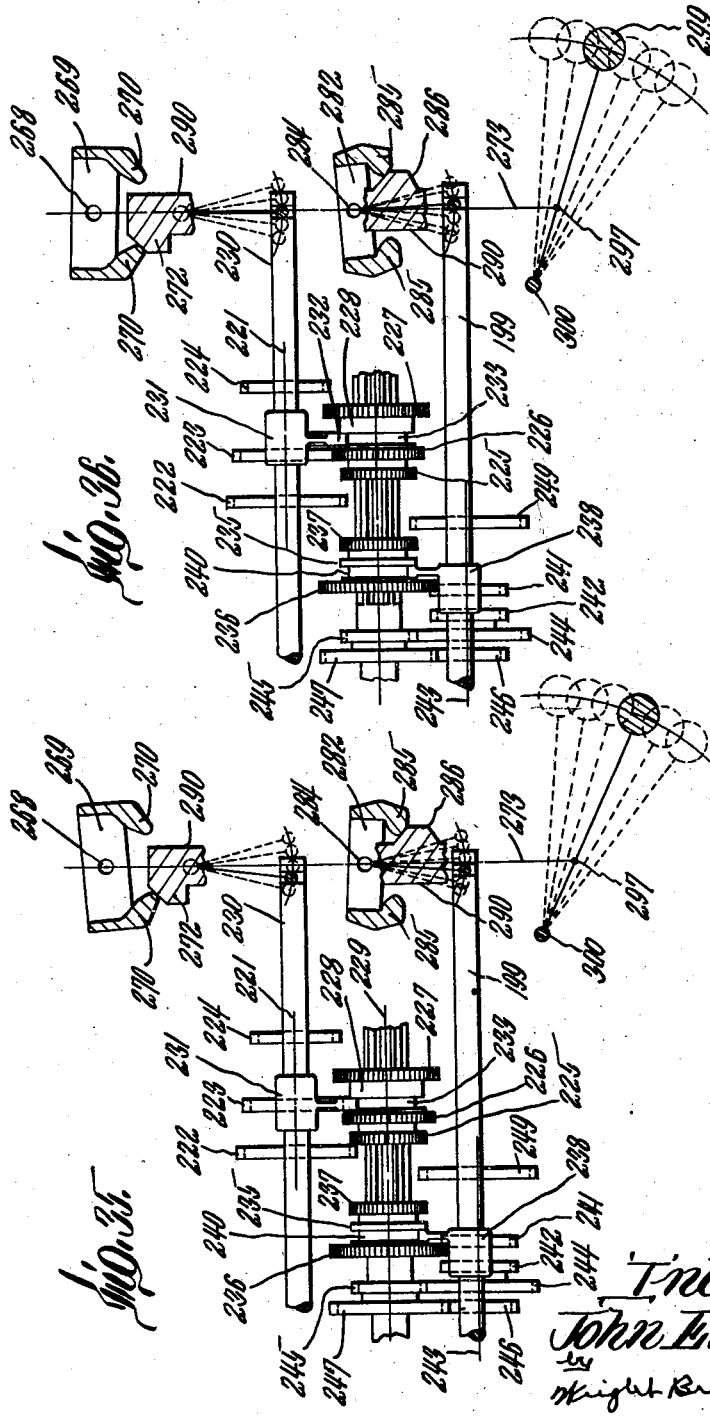

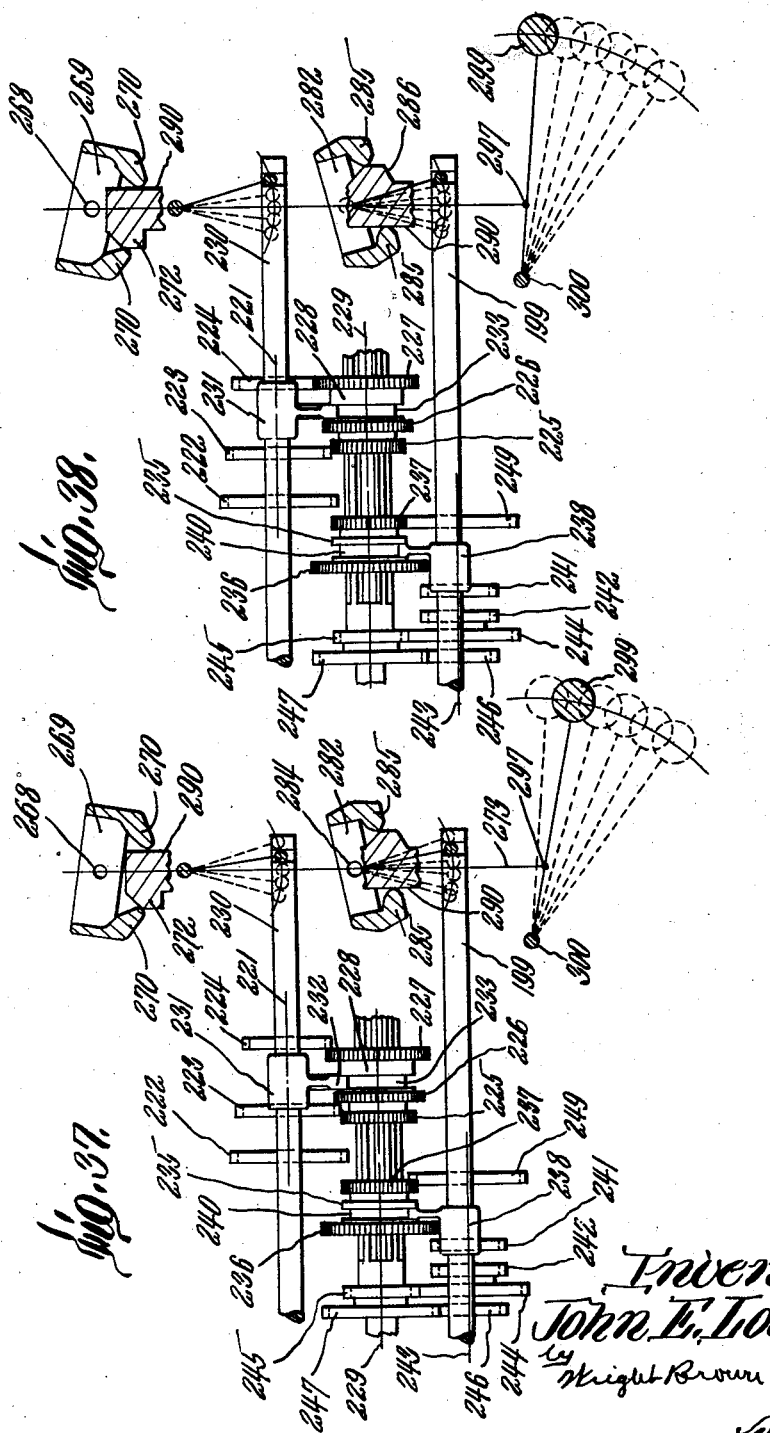

Patented Oct. 6, 1936

2,056,792

UNITED STATES PATENT OFFICE 2,056,792

LATHE AND THE LIKE SPEED CONTROL MECHANISM

John E. Lovely, Springfield, Vt., assignor to Jones
& Lamson Machine Company, Springfield, Vt.,
a corporation of Vermont Application August 7, 1934, Serial No. 738,772

11 Claims. (Cl. 29—46)

This invention has for an object to provide a highly flexible speed control for lathes and the like which avoids the necessity of the use of change gears and provides for quick and easy setting of the various movable parts for a wide range of selected relative speed and while the machine is running.

A further and important object of the invention is to provide speed changing apparatus so arranged that the speed ratios shall be by positive gear connections and yet which avoids any possibility of the parts failing to move smoothly from one to a different adjusted position, or becoming stalled or locked against movement at any time when such movement may be desired, and which insures full meshing of the gears which are in driving relation.

Further objects reside in refinements and improvements in the various mechanisms as will later more fully appear.

For a more complete understanding of this invention, reference may be had to the accompanying drawings in which Figure 1 is a detail section on line 1—1 of Figure 19 showing one of the gear shifting mechanisms.

Figure 2 is a detail section on line 2—2 of Figure 1.

Figure 3 is a detail section on line 3—3 of Figure 4.

Figures 4, 5, 6, and 7 are detail sections on the correspondingly numbered section lines of Figures 1 and 3.

Figure 8 is a detail section on line 8—8 of Figure 4.

Figure 9 is a fragmentary elevation showing the control handle and related parts of the mechanism of the previous figures.

Figure 10 is a detail section on line 10—10 of Figure 9.

Figure 11 is a view similar to Figure 10, but showing the handle in unlocked position.

Figure 12 is a view partly broken away and showing gear selector parts in elevation.

Figures 13 to 18, inclusive, are diagrammatic views illustrating successive shifting of the gears from lowest to highest speed.

Figure 19 is a front elevation of the lathe embodying the invention.

Figure 20 is a fragmentary longitudinal section just inwardly of the front plate of the apron and taken on line 20—20 of Figure 21.

Figures 21 and 22 are sections on correspondingly numbered section lines of Figure 20.

Figures 23 and 24 are sectional views on the correspondingly numbered section lines of Figure 19.

Figure 24a is a fragmentary section showing a two-direction knock-off release.

Figures 25 and 26 are diagrammatic views illustrating the reverse gear mechanism in the tool carriage apron.

Figures 27 to 32 are detail sections on the correspondingly numbered section lines of Figure 22.

Figures 33 to 38, inclusive, are diagrammatic views illustrating successive positions of the shifter elements and gears from lowest to highest speeds.

Referring first to Figure 19, at 1 is indicated the bed of a lathe having a headstock 2 at one end thereof. At 3 is shown a turret saddle carrying a turret 4 of any suitable description thereon, this saddle being movable toward and from the headstock 2 on the ways 5 in accordance with usual practice. At 6, positioned between the headstock and turret saddle, is a tool carriage which carries thereon a cross feed slide at 7 carrying a suitable tool support herein indicated as a manually rotatable tool-carrying turret 8. For the purposes of this invention it should be understood that any suitable tool carrier may be employed.

The saddle 3 is provided in the usual manner with an apron 10 depending from the ways 5 along the front of the machine and the tool carriage 6 is also provided with an apron 11 similarly positioned. Running along the forward face of the lathe and extending through the aprons 10 and 11 is a rotatable feed shaft 12. This feed shaft at the headstock end may pass into a gear box 13 and may have fixed thereon within this gear box a feed gear 15 shown in dotted lines in Figure 2. This gear 15 meshes through a gear train comprising the gears 16, 17, 18 and 19 with the headstock spindle 20, which is shown in Figure 19 as having a suitable chuck or other work support 21 on its forward end. Thus the feed shaft 12 is driven from the lathe spindle through the intermeshing gear train and is thus rotated in definite timed relation thereto.

As is usual with machines of this type, the aprons of the turret saddle and the tool carriage contain mechanism by which these respective members may be caused to traverse along the ways 5. As shown for this purpose there is provided a rack bar 25 secured to the machine bed with which mesh suitable gears carried in these aprons and which may be driven, as will later appear, by rotation of the feed shaft 12.

Spindle drive mechanism

The lathe spindle is shown as driven by a train of gearing from a jack shaft 30 (see Figure 2). This shaft drives a shaft 31 either directly through a gear 32 on the jack shaft meshing with a gear 33 journaled on the shaft 31 and which may be clutched thereto by a suitable clutch mechanism indicated in Figure 1 as in the clutch housing 34, or the shaft 31 may be driven in the reverse direction by driving from the jack shaft 30 through the gear 35 thereon, shown in dotted lines in Figure 1, through the gear 36 on the reversing shaft and from this gear 36 directly back to the gear 37 journaled on the shaft 31. This gear 37 may be clutched to the shaft 31 when the gear 33 is unclutched, by a suitable clutch mechanism (not shown) indicated in the clutch housing 38. By this arrangement the shaft 31 may be driven in either direction at will by manipulation of the clutches within the casings 34 and 38. The particular mechanism for actuating these clutches forms no part of the present invention.

The shaft 31 is arranged to drive the shaft 40, either directly or through a back gear shaft 41. This drive is by either of the gears 42 or 43 thereon which are of different size and are carried by a sleeve 44 which is slidable on the shaft 31. These gears 42 and 43 may be moved selectively into mesh with the gears 45 and 46, respectively, secured to the shaft 40. The shaft 40 also has loose thereon, but secured together, a pair of gears 47 and 48, and a gear 49 of the same size as the gear 47 is fixed on the shaft 40. There is also a shaft 50 which has slidably keyed thereto a sleeve 51 on which are fixed the gears 52 and 53. By sliding these gears 52 and 53, upwardly as shown in Figure 1, the gear 52 may be brought into mesh with the gear 46 on the shaft 40. In the intermediate position of this sleeve 51, as shown in Figure 1, the gear 53 is in mesh with gear 49 fixed on the shaft 40, and in the lower position of the sleeve 51 the gear 53 is in mesh with the gear 47 journaled on the shaft 40. A gear 55 fixed to the back gear shaft 41 is in mesh with the gear 49 so as to be driven by the shaft 40 and a gear 56 fixed to this back gear shaft 41 is in mesh with the gear 48. The gears 49, 55 and 56 and 48 are of such relative sizes that the gear 47, while of the same size as the gear 49, is driven at a somewhat lower speed. Thus the shaft 50 may be driven at two different speed ratios relative to the shaft 40 when the gear 53 is in mesh with the gear 49 or with the gear 47. It can also be driven at a still different speed when the gear 52 is in mesh with the gear 46. The shaft 50 also carries slidably keyed thereto a sleeve 60 having gears of different size 61 and 62 secured thereto. In the upper position of this sleeve the gear 61 meshes with a gear 63 secured to the spindle 20 and in the lower position of this sleeve 60 the gear 62 meshes with the gear 64 on this spindle and it may have an intermediate neutral position when neither gear 61 nor 62 is in mesh and when the spindle is not being driven.

In order to obtain the different speed ratios possible with this mechanism, it will be seen that there are two driving positions of the sleeve 44, three driving positions for the sleeve 51 and two driving positions and a neutral intermediate position for the sleeve 60. Means are therefore provided for selectively moving and holding these sleeves in the positions desired to effect the desired driving speed of the work spindle, and one of the important features of this invention relates to the control and movements of these sleeves so that at no time is there a disconnection of the drive at more than one place in the entire train. This makes possible the shifting of the gears to any desired position from any other position without danger of any of the gears becoming stalled by striking on other gears more than momentarily, since wherever a gear disconnection takes place, all the gears previously in the train are in motion during the rotation of the drive shaft so that the gear faces are slipping by each other and when they are in proper relation the gear being shifted may pass into mesh with its driving gear without difficulty. Were this sequential operation not provided, a gear might be presented to a gear with which it was desired to mesh while both gears were stationary, and in such a manner that the gears could not come into meshing relation, but by providing for only one disconnection at a time one of the gears is always in rotation when they are presented together.

The particular means herein shown for producing the sliding of the various gears and sleeves is of the type shown in the Twamley patent application Serial No. 671,033, though in so far as the broader aspects of this part of the invention is concerned any desired type of mechanism could be employed so long as the sequential shifting of the gears as hereinbefore specified is carried out. There are, however, certain refinements of the Twamley type mechanism herein shown which are of importance in producing smooth and controlled action of the various sliding gears. As shown the sliding sleeve 44 is actuated by a lever 70 journaled at 71 as on a pin secured to the upper face of a gear casing or housing 72. One end of the lever 70 is shown as carrying pivoted thereto a U-shaped yoke 73 the sides of which engage on opposite sides of the gear 42 so that as the yoke is moved by swinging the lever 70, the gears 42 and 43 are moved from one to the other of their respective positions. In order to take up any lost motion of these parts and insure accurate and complete intermeshing of the gears 42 and 43 with their respective gears 45 and 46, means are provided for yieldingly holding the lever 70 with its yoke member 73 in proper engagement with the gear 42 and with definite accurate stop limits of motion of this lever. As shown both of these functions are accomplished by a spring pressed ball 75 seated within a hollow plug 76 threaded into the gear housing 72, the ball pressing the lever 70 downwardly at its end carrying the yoke 73 and the sides of the plug 76 cooperating with stop lugs 77 and 78 on the lever 70. The sleeve 51 is similarly moved and controlled by a lever 80 journaled at 81, this lever 80 having a yoke member 82 engaging about opposite sides of a circular flange 83 on the sleeve 51. This lever 80 is similarly controlled and limited in its motions by a spring pressed ball seated in a plug sleeve 85 with which cooperate stops 86 and 87 on the lever 80. The sleeve 60 is also similarly moved and controlled by a lever 90 having cooperating therewith a spring pressed ball in a hllow plug 91 with which also cooperate the stops 92 and 93. This lever 90 is fulcrumed at 94.

The selection of the various positions of the sliding gears and their movements to these selected positions are shown as produced, as in the Twamley mechanism, by a plurality of selectors 100, 101, and 102 which are secured together and may be made integral with each other and carried fixedly by a rock shaft 103. Each selector is provided with segments such as 104, 105, and 106. The segments 104, as shown in Figure 5, are of two different radii, the high segments being shown at 104a and the low segments at 104b and in each instance, except one, a high segment is opposite to a low segment. Cooperating with these segments is the rocker member 110 journaled as on the journal pins 111 (see Figure 8) and connected to turn with the rocker element 110 is an arm 112 slotted at its outer extremity as at 113 to engage a pin 114 carried by one end of the lever 70. The rocker 110 carries at diametrically opposite points a pair of inwardly extending fingers 115. The inner ends of these fingers are so spaced that when a high segment 104a bears against one of these fingers 115, the other finger bears against the oppositely disposed low segment 104b, the two, therefore, when the shaft 103 is in its inner axial position, bridging the fingers 115 and securely holding the rocker 110 in either one or the other of its rocked positions, in one of which one of the fingers 115, bears against the end of a high segment 104a, and in the other of which the same finger 115 bears against a low segment 104b. Similarly the selector 101 controls the rocked position of a rocker 120 which carries an arm 121 engaging a pin 122 on the lever 80 and likewise the selector 102 may control the angular position of a rocker 130 carrying an arm 131 operatively engaging the end of the lever 90. The segments 105 of the selector 101 are of three different radial extents, there being the high segments 105a, the low segments 105b, and segments of intermediate heights 105c. The segments 105a are oppositely disposed to low segment portions 105b and the intermediate height segments 105c are disposed oppositely to each other. These segments, therefore, locate three different rocked positions of the lever 80 corresponding to the three operative positions of the sliding gear sleeve 51. In the same manner the segments 106 of the selector 102 have high portions 106a, low portions 106b and portions of intermediate height 106c, which define the three operative positions of the gear-carrying sleeve 60, comprising two speed positions and a neutral position where the spindle 20 is out of geared connection with the driving mechanism.

There is also preferably provided mechanism for holding the shaft 103 in any of its various angular positions corresponding to definite controlling angular settings of the selectors with reference to their rockers. This is shown in Figures 4 and 8 wherein the shaft 103 is shown as carrying a disk 135 having notches at 136 about its periphery, in any of which may engage a spring pressed ball 137. This disk 135, as shown best in Figures 4 and 8, is held against axial motion with the shaft 103, being formed with a central perforation 140 through which passes a hub 141 of a member 142 bearing on the outside end of the casing portion 145 which is shown as secured to the casing 72. The members 135 and 142 are secured together as by screws 146.

In order that the selectors may be turned freely to any selected position they are arranged to be moved axially out of cooperative relation to their rockers 110, 120 and 130, for this purpose the shaft 103 being mounted for axial motion at one end in the bushing 147 and at the other in the member 142 to which it is slidably keyed. This member 142 is shown as provided with an ear 150 on which is fulcrumed at 151 a lever 152 (see Figures 2, 9, 10, and 11). This lever 152 is shown as provided with a ball handle 153. It also is provided with a cross pin 154 which may engage in a notch 155 in the outer end of the shaft 103. Thus by rocking the handle 153 about the fulcrum 151 the shaft 103 can be pulled outwardly, bringing the selectors out of operative relation to their rockers. The handle may then be turned about the axis of the shaft 103 to the desired angular position corresponding to the particular speed setting desired, whereupon the handle may be thrust inwardly, moving the selectors into operative position, each selector having inclined faces on its controlling segments as at 160, 161 and 162 (see Figures 3 and 5), which engage the rocker fingers, and as the shaft 103 is pushed inwardly, cause these rocker fingers to assume the rocked positions corresponding to the arrangements of the selector segments at that particular angular position of the selectors. A spring pressed pawl 163 (see Figures 10 and 11) may be employed to engage a notch 117 to yieldingly hold the handle 153 in its operative gear-selected position shown in Figure 10.

The end wall of the casing 145 may have thereon a scale as at 165 having indicated thereon in successive segmental portions numbers representing the spindle revolutions per minute for normal drive speed of the driving shaft 30, and the member 142, which is keyed to the shaft 103, may have a suitable pointer as 166 cooperating with the dial indications.

It will be noted from an inspection of Figures 3 and 4 that the outer faces of the selector segments for the selectors 100, 101, and 102 are of different lengths and they are so arranged that the rockers are moved at different times during the inward axial motion of the shaft 103 with the selectors thereon. These parts are so arranged that the sliding gears are thrown in sequential relation so that there are never two points of disconnection in the entire train of gearing at one time.

The sequence of actions of the various gears when they are being moved from their lowest to their highest speed ratios are shown in Figures 13 to 18, inclusive. Figure 13 shows the low speed position where the gear 43 of shaft 31 is in mesh with gear 46 and where gear 53 is in mesh with gear 47 on the shaft 40 so that the drive is through the back gear shaft 41. The gear 62 is also in mesh with the spindle gear 64. Dividing the path of motion of the handle from "out" to "in" position in six equal angular parts, the successive positions of these gears are shown in Figures 13 to 18. In Figure 14 in the second position of the handle, the gear 43 is moving out of mesh with the gear 46, the other gears remaining as in Figure 13. In Figure 15 the gear 42 has been brought into mesh with the gear 45 and the gear 53 has been moved out of mesh with the gear 47 and into mesh with the gear 49, and the gear 62 is moving out of mesh with the gear 64. In Figure 16 the gear 42 is shown in full mesh with the gear 45, the gear 53 is moving out of mesh with the gear 49, the gear 62 is out of mesh with the gear 64, and the gear 61 is approaching mesh with the gear 63. In Figure 17 the gear 42 is in the same position shown in Figure 16, the gear 52 has come partly into mesh with the gear 46 and the gear 61 has come into mesh with the gear 63. In Figure 18 the gears 42 and 45 are in full mesh, as are also the gears 46 and 52, and the gears 61 and 63, this being the highest speed position of the gears. At no time during this shift is the gearing entirely interrupted at more than one place in the drive so that all the gears previous to the interruption are in rotating relation with the drive shaft. By this arrangement if the sliding gear at the broken connection initially contacts with the end of a tooth of the gear with which it is desired to mesh it, the rotation of the driving one of these gears causes the parts to adjust themselves so that meshing may be effected. This arrangement also obviates the necessity of any yielding connection between the shift mechanism and the gears being shifted, so that when the handle has been moved to its full "in" position, the gears which are in mesh are in full mesh, having been moved over positively by the selector mechanism. Likewise as the rocker members bridge across the segments of their respective selectors, and the selectors have a motion of disengagement substantially at right angles to the rocking motion of the rocker fingers, these rocker fingers are securely locked in selected positions and there is no force exerted through the drive of the gears which tends to throw the selectors out of controlling positions. With the arrangement shown it is evident that not only is the speed of rotation of the head-stock spindle controlled by the setting of the selector mechanism but also the speed of the feed shaft 12 is also similarly controlled.

*Tool slide feed*

As previously mentioned, the tool slide apron 11 contains mechanism driven by rotation of the feed shaft 12 to effect its feed along the ways 5 and the rate of this feed, in accordance with this invention, is controlled by a selective speed mechanism which is operative during the rotation of the feed shaft. Referring to Figure 20, the rack bar 25 has engaged therewith a pinion 200 fixed to a shaft 201 in the apron 11. This shaft 201 also carries a gear 202 within the apron which meshes with a pinion 203 mounted on a shaft 204. A hand wheel 205 (see Figure 19) is also mounted on the shaft 203 in front of the forward face of the apron 11 for manual actuation of the carriage feed mechanism. Gear 202 also meshes with a pinion 206, which, as shown best in Figure 24, is carried by a sleeve 207. This sleeve 207 also carries a clutch element 208 which normally meshes with a mating element 209. To the clutch element 209 is secured, as by rivets 210, a worm gear 211. This element 209 also carries a gear 212. The sleeve 207 and the clutch element 209 with the parts carried thereby are all journaled on a shaft 213, and by means which will later be described, the clutch elements may be disconnected automatically when the tool carriage has reached a desired traverse limit. As shown in Figures 20 and 21 the gear 212 meshes with a pinion 214 journaled on a shaft 215. Fixed to or integral with the gear 214 is a clutch element 216 similar to the clutch element 209 and this clutch element 216 cooperates with a second clutch element 217 on a sleeve carrying a gear 218. This gear 218 meshes with a pinion 219 (see Figure 20) on the end of a feed screw by which the tool slide is given its motion transverse to the spindle axis in a well understood manner. The clutch elements 216 and 217 may also be automatically disconnected at the desired limits of travel of the cross tool slide.

The worm gear 211 is shown as driven by a worm 220 fixed to a shaft 221 and this shaft is arranged to be rotated through a change gear mechanism from the rotation of the feed shaft 12. This change gear mechanism comprises three gears 222, 223 and 224 of different sizes secured to the shaft 221 with which may be brought selectively into mesh gears 225, 226 and 227, respectively, carried by a sleeve 228 slidable on a splined shaft 229 (see Figures 20 and 21 and the diagrams, Figures 33 to 38). The sleeve 228 may be moved axially of the shaft 229 to bring the gears 225, 226, and 227 thereon selectively into mesh with their respective gears 222, 223, and 224 by means of a shift rod 230 which carries a shifter arm 231 having a portion 232 riding in a peripheral groove 233 in the sleeve 228. The shaft 229 also has slidable thereon a second sleeve 235 carrying the larger gear 236 and the smaller gear 237. This sleeve 235 may be moved axially by the shift rod 199 which has a shifter member 238 secured thereto having a finger 239 riding in an annular groove 240 in the sleeve 235. The gear 236 may be moved selectively into mesh with either of a pair of equal size gears 241 and 242. The gear 241 is secured to the shaft 243. The gear 242 is loose on the shaft 243 and has fixed thereto a large gear 244. This gear 244 meshes with a gear 245 carried by the back gear shaft 229. The shaft 243 also has fixed thereon a gear 246 which meshes with a gear 247 secured to the gear 245. The shaft 243 also has fixed thereto a gear 249 of larger diameter than the gears 241 and 242. The feed shaft 12 drives the shaft 243 either directly or through a reverse gear mechanism. For this purpose the feed shaft 12 has keyed thereon a long gear 250 (see Figures 25 and 26). This long gear meshes continuously with a pinion 251 which is secured to a reverse shaft 252 (see Figures 21, 25, and 26). The reverse shaft 252 also carries a pinion 253 of the same size as the pinion 251. The shaft 243 has slidably keyed thereon a gear 254 which may mesh with either the gear 253 on the reverse shaft 252 or directly with the long gear 250 on the feed shaft 12. When it meshes directly with the long gear 250 the reverse shaft 252 is rotated idly by the long gear 250, the transmission being directly from the long gear 250 to the shaft 243 through the gear 254. When the gear 254 is moved to its other position meshing with the gear 253, the shaft 243 is driven from the long gear 250 through the gears 251 and 253 of the reverse shaft and is thus driven in the reverse direction to that where the gear 254 is driven directly from the long gear 250. The gear 254 may be shifted by any suitable means (not shown), an operating handle therefor being shown at 255 on Figure 19. It will thus be seen that the traversing tool carriage may be caused to traverse in either of opposite directions by the rotation in one direction of the feed shaft 12.

Means are provided for shifting the sleeves 228 and 235 through the shifting of their control rods 230 and 199. The shift rod 230 has near its outer end a slot 260 in which rides a head 261 of a pin 262 journaled in the outer end of a lever 263 (see particularly Figures 22 and 32). This lever 263 is journaled on the pin 264 and has a segmental toothed end 265 which meshes with a corresponding segmental tooth portion 266 on a rocker 267. This rocker is shown as pivoted at 268, and is provided with an arcuate portion 269 (see Figure 30) having inwardly directed opposed fingers 270. These fingers cooperate with segmental cam selector elements 271 having high portions 271a, low portions 271b and portions of intermediate height 271c. These elements 271 are portions of a selector 272 carried by a rockable and axially movable selector shaft 273. In a similar manner the shifter rod 199 is connected through a pin and slot connection at 280 to an arm 281 secured to a rocker member 282 (see Figures 29 and 31). This member 282 is shown as annular in shape and is pivotally mounted at diametrically opposite points on the pivot members 283 and 284. It likewise has oppositely disposed fingers 285 which may engage with segmental selector cam elements 286. These cam elements comprise a high portion 286a, a low portion 286b and a pair of portions 286c of intermediate height. They are shown as integral with the cam selector portions 271 both being shown as formed on a sleeve 290 secured to the shaft 273 as by a pin 291. These selector segments have inclined faces such as 292 and 293 which when the rock shaft is moved inwardly or to the right, as shown in Figure 22, engage their respective rocker fingers and determine the angular positions of these rockers and thus the shifted positions of the gear sleeves 228 and 235. On moving the rock shaft 273 outwardly or to the left, as shown in Figure 22, these selectors are brought out of cooperative engagement with the rocker fingers. The shaft 273 may then be turned to any selected angular position corresponding to a desired speed ratio between the feed shaft 12 and the speed of traverse of the tool carriage or the speed of transverse feed of the tool slide, whereupon the shaft may be returned to its inward position, causing the sliding gear sleeves to take their proper axial positions to produce such speed ratios.

The shaft 273 extends outward from the casing 235 of the apron 11 within which the various mechanisms are housed and is provided at its outer end with a slot 296 in which may bear a cross pin 297 carried by the handle member 298. This handle member may be provided with a ball handle portion 299. This handle member may be mounted similarly to the handle member 152 of the spindle speed control mechanism. As shown best in Figures 22 and 27 it is fulcrumed at 300 on an ear 301 projecting from a sleeve 302 through which the shaft 273 passes. This sleeve 302 has a flange 303 on its outer face which is held against the outer face of the casing member 295 by a collar 304 through which the sleeve 302 passes and which bears against the inner face of an annular casing portion 305. It is held in such position as by a nut 306 threaded on the inner extremity of the sleeve 302, a member such as a lock washer 307 being inserted between the nut 306 and the collar 304. The collar 304 may be keyed to the sleeve 302 as shown in Figure 28 to turn therewith, and may be provided with serrations as at 309 with which may be engaged the spring pressed detent ball 310. This ball is carried by the plug 311 secured as by threaded engagement with a portion 312 of the casing 295. This ball 310 serves to yieldingly hold the shaft 273 in any angular position to which it may have been adjusted corresponding to a desired speed ratio of feed shaft to carriage traverse or to tool slide feed movement. The member 303 may be provided with a suitable dial as at 315 for cooperation with an index pin 316 secured to the casing 295, the sleeve 302 rotating with the rock shaft 273.

These selectors and rocker fingers are so related that during any shift from one speed ratio to another, the driving connection is interrupted only at one point at any one time, as previously described with reference to the spindle speed control mechanism.

Figures 33 to 38, inclusive, show successive positions of the shift mechanism and the gears when changing from lowest to highest speeds. Figure 33 shows the parts in their lowest speed, the gear 225 being in mesh with the gear 222 and the gear 236 being in mesh with the gear 244 so that the drive is through the back gear arrangement, comprising the gears 244, 245, 247, and 246. The control handle 298 having been pulled outwardly and turned to the high speed position, the gear shifting occurs step by step as is shown in Figures 34 to 38 as the handle is pushed inwardly. In Figure 34 the gear sleeve 228 is in the same position as shown in Figure 33. The gear sleeve 235 has been moved slightly so that the gear 236 is moving out of mesh with the gear 242 to cut out the back gear connection, and is moving toward the direct gear connection through the gear 241. In Figure 35 this change has just been effected, the gear 236 having just come into mesh with the gear 241. At the same time the sleeve 228 has been moved so that the gear 225 is just passing out of mesh with the gear 222 and the gear 226 is being brought into mesh with the gear 223. In Figure 36 the sleeve 235 has been moved to the point where the gear 236 is still in mesh with the gear 241 but is about to leave it and to bring the gear 237 into mesh with the gear 249, while the sleeve 228 has moved to bring the gear 226 into full mesh with the gear 223. In Figure 37 the gear 237 is shown partly in mesh with the gear 249 while the gear 227 on the sleeve 228 is about to come into mesh with the gear 224, all the other gears on this sleeve 228 being out of geared connection. In Figure 38 the sleeve 235 has been moved to bring the gear 237 into full mesh with the gear 249 and the gear 227 has been moved into full mesh with the gear 224 so that the parts are in their final high speed position and the handle is all the way in.

*Knock-off mechanism for the tool carriage*

Means are provided by which when the tool carriage has reached a desired position in its traverse, its traversing mechanism is automatically disconnected from the feed shaft. While this mechanism may be of any suitable description and forms no part per se of the present invention, being shown and claimed in my application for patent, Serial No. 640,927 filed November 3, 1932, for Feed knock-off mechanism for lathes, a brief description will be here given. Referring particularly to Figure 24, it will be noted that the clutch element 209 has seated therein spring pressed pins such as 400, the ends 401 of which may ride in an annular channel 402 in the end face of the clutch element 208. Each spring 403 reacts between the base of a socket 404 in which it is placed and a member 405 which bears against a cross pin 406 through the pin 400, so that the springs tend to push the clutch element 208 away from the clutch 209 to disconnect them. In order to hold the clutches into contact there is provided a lever 407, this lever being loosely mounted on a sleeve 408 keyed or otherwise secured to the shaft 213. The sleeve 408 is grooved at its outer end to receive loosely a cam ring 409 which is pinned to the hub portion of the lever 407 as by a pin 410, so as to be rocked therewith. This cam ring 409 has a pair of notches 411 therein each having a sloping side face, into which may extend a pair of balls 412 backed up by axially movable pins 413 slidable axially through the sleeve 408. At their inner ends these pins 413 bear against a ring 414 which in turn bears against the outer raceway 415 of a thrust ball bearing 416. When the handle 407 is in the position shown in Figure 24 the balls 412 are out of register with the notches 411 so that the sleeve 207 is moved over and the clutch 208 is in clutching engagement with the clutch element 209. The handle 407 may be moved into this position and there latched, but is normally biased as by gravity or otherwise out of this position. The latch mechanism, as shown, comprises a latch pin 420 spring pressed as by the spring 421 into an opening 422 in the outer end of a latch plug 423, which is secured as by threading into the casing 424 of the apron 11. The outer end of the latch pin 420 is provided with a cross pin 425 which secures it to a head 426. The latch pin itself is seated in a sleeve 427 secured through the outer end of the lever 407 and is provided with a notch 428 in which the pin 425 may seat. Pivoted on the sleeve 427 is a release handle lever 430. In the outer face of the lever 430 are positioned a pair of balls 431, which in the position of the parts shown in Figure 24, bear in recesses 432 in the inner face of the head 426. By rocking the handle 430 to bring these balls out of these recesses the head 426 is pushed outwardly, retracting the latch pin 420 from the socket 422 and permitting the lever 407 to drop so that the notches 411 are brought into registry with the balls 412, whereupon the clutch element 208 is retracted by the pressure of the spring pins 406. Any suitable means may be provided for yieldingly holding the lever 430 in non-releasing angular position. This handle 430, therefore, provides for a manual release of the driving connection of the feed carriage with the feed shaft. An automatic release is also illustrated, this comprising a latch release pin 450 normally retracted by a spring 451, both the pin and spring being mounted within the plug 423. The pin 450 has a head 453 at its inner end on which may bear the rounded end portion 454 of a lever 455 fulcrumed at 456. This lever is also provided with a rounded projection 457 on which bears a wear pin 4580 at the inner end of a knock-off block 458 slidably mounted in the end face of the apron 11. This knock-off block 458 may be provided with adjustable abutment plugs 459 with any selected of which a stop element 460 (see Figure 19) may be brought into registry. This element 460 may be adjustably secured by any suitable means in a sleeve 461 secured to a suitable frame portion of the machine, as is well known, so that when the carriage traverses to such a point that any of the stops 459 of the block 458 strike the stop element 460, the stop block 458 is moved inwardly and the latch release pin 450 pushed outwardly, retracting the latch pin 421 from its socket 422 and allowing the handle 407 to drop to disconnect the clutch elements 208 and 209 as has been previously described.

The other clutch connection produced by the clutch elements 216 and 217 is in the train of gearing to the cross tool feed screw 219 as previously described and this may be constructed similarly to produce an automatic knock-off of the cross feed slide in either direction as may be desired.

It will usually be found desirable to provide for automatic knock-off for opposite limits of motion of the cross tool slide, in which case the knock-off block 470 (Figures 19 and 24a) may be arranged to be operative to release its lock lever on motion in either direction. It may be so moved by impingement on either one of spaced dogs, one for each limit of motion, one being shown at 471 in Figure 24a. Motion of the block 470 acts to rock a lever 472 fulcrumed at 473, and this lever 472 has a notched end presenting oppositely inclined cam faces 474 and 475, either of which is effective against the head 476 of a release pin 477 to press the pin outwardly against the latch pin 479 in the locking lever 478. This lever 478 is arranged as is the lever 407 shown in Figure 24 and acts in a similar manner to control the engagement or disengagement of the clutch elements 216 and 217 which are arranged and operated similarly to the clutch elements 208 and 209 shown in Figure 24.

Similarly the traversing motion of the turret saddle may be produced by rotation of the feed shaft 12, there being a similar geared connection between this shaft 12 and the rack bar 8 to that described for the traverse of the tool carriage, the speed ratio being controlled by a similarly arranged system of sliding gears and rockers, the control handle for the selector mechanism being shown at 500 in Figure 19. There is, of course, no transverse feed for the turret mechanism so that this is omitted from the mechanism within the apron 10. It will be noted, however, that the speed control for the turret saddle traverse is entirely independent from that of the tool carriage traverse or the tool slide feed.

Similarly to the carriage traverse control knock-off, mechanism may be provided for limiting the traverse of the turret saddle. This has been shown somewhat diagrammatically in Figure 23 in which a latch mechanism similar to that shown in Figure 24 is employed for holding the spring-opened clutch of the traversing feed mechanism in closed position. At 505 in Figure 23 is shown the latch lever with its hand-release handle 506 similar in all respects to the mechanism shown in Fig. 24. The latch release pin, as shown in Figure 23, however, may be actuated by a lever 507 fulcrumed at 508 and having bearing thereon on its arm 509 a push rod 510. This push rod may be actuated by the turning of a rock shaft 511 having a cam face 512 on which the end of the rod 510 impinges. The rocking of the shaft 511 may be produced by impingement on a cam face 514 thereon of any of the stop bars 513 which may be controlled in the well known manner by the movement of the turret saddle, these corresponding, for example, to the bars 241 shown in the Hartness Patent No. 771,242.

From the foregoing description of an embodiment of this invention, it will be seen that provision has been made for controlling the speed of the work spindle and also for controlling the speeds of traverse of both the tool carriage and the turret saddle relative thereto and independently of each other, and that all these speed controls may be actuated while the machine is in operation and without the necessity of using change gears which would require that the machine be stopped. Likewise the cross tool feed may be actuated at an adjustable speed while the tool carriage is either stationary or moving and the tool carriage may be traversing at a desired speed with the tool cross feed either in or out of operation. It will also be evident that many changes and modifications might be made without departing from the spirit or scope of this invention as defined by the appended claims.

I claim:

1. In combination, at least three shafts including a drive and a driven shaft and one or more intermediate shafts, selectively intermeshing gears between said shafts for transmitting motion from said drive shaft to said driven shaft, and mechanism actuable to shift said gears selectively including means preventing interruption in the geared connections between more than two shafts at any one time when shifting from one to any other selected gear arrangement.

2. In combination, a plurality of shafts, selectively intermeshing gears between said shafts, gear controlling and shifting devices, a gear selector for each device, means for rigidly connecting said selectors together, said selectors having cam faces for selective cooperation with said devices to shift said devices on relative movement therebetween, said cam faces and devices being so related as to produce successive disconnections of said geared connections so that only one adjacent pair of shafts in the driving sequence is disconnected at any one time, and means for effecting said relative movement.

3. In combination, a plurality of shafts, selectively intermeshing gears between said shafts, gear controlling and shifting devices, a gear selector for each device, means for rigidly connecting said selectors together, said selectors having cam faces for selective cooperation with said devices to shift said devices on relative movement therebetween, said cam faces and devices being so related as to produce successive disconnections of said geared connections so that only one adjacent pair of shafts in the driving sequence is disconnected at any one time, and means actuable to first actuate said selectors to select the desired gear arrangement and then to effect the relative movement between said selectors and devices to shift the gears into such selective arrangement.

4. A gear selecting and changing mechanism comprising in combination, a plurality of shafts, gearing selectively intermeshing between said shafts, means for driving one of said shafts, gear controlling and shifting devices, a selector for each device, and means actuable to cause said selectors to first select and then to actuate said devices in accordance with such selection, said selectors and devices being so arranged that only one pair of adjacent shafts in the train is out of geared connection at a time during change from one to any other geared connection.

5. A gear selecting and changing mechanism comprising in combination, a plurality of shafts, gearing selectively intermeshing between said shafts, means for driving one of said shafts, gear controlling and shifting devices, a selector for each device, and means actuable to cause said selectors to first select and then to actuate said devices in accordance with such selection, said selectors and devices being so arranged that there is never more than one complete interruption in the geared connections between said shafts at one time during any entire change from one to a different speed setting of said mechanism.

6. In combination, a plurality of shafts, gears on said shafts, certain of said gears being slidable on their respective shafts for selective intermeshing with gears on other of said shafts, means including a lever for shifting certain of said sliding gears, and stops cooperating with said lever and spaced from the fulcrum thereof for accurately determining the limits of shifted positions.

7. In combination, a plurality of shafts, gears on said shafts, certain of said gears being slidable on their respective shafts for selective intermeshing with gears on other of said shafts, means including a lever for shifting certain of said sliding gears, certain of said sliding gears presenting an annular ribbed portion, a U-shaped member straddling said rib portion, an arm carrying said member, means for moving said arm to shift said gears, and means for yieldingly pressing said member toward said rib portion.

8. In combination, a plurality of shafts, gears on said shafts, certain of said gears being slidable on their respective shafts for selective intermeshing with gears on other of said shafts, means including a lever for shifting certain of said sliding gears, certain of said sliding gears presenting an annular ribbed portion, a U-shaped member straddling said rib portion, an arm carrying said member, means for moving said arm to shift said gears, means for yieldingly pressing said member toward said rib portion, and stops cooperating with said pressing means to define the limits of shifting of said slidable gears.

9. In combination, a plurality of shafts, gearing selectively intermeshing between said shafts, certain of said gears being slidably mounted on their respective shafts, selectors for said slidable gears, each selector having cam faces arranged circumferentially, a movable member for each selector having spaced arms between which oppositely disposed cam faces of its selector may be placed to bridge said arms and thereby definitely position said member, operative connections between said members and their respective gears, and a device carrying all of said selectors movable in one manner to select the operative cam faces, and in another manner to move said cam faces into and out of operative relation to their respective members, said selector cam faces being so relatively arranged that when they are moved into operative relation to their respective members and shift said sliding gears but one disconnection of gearing occurs at any one time during the entire shifting movement.

10. In combination, a plurality of shafts, gears on said shafts, certain of said gears being slidable on said shafts for selective intermeshing with gears on the other of said shafts, shift rods movable substantially parallel to the sliding motion of said sliding gears, operative connections between said rods and gears, a rock member having a portion operatively engaging each of said rods, each of said rock members having a pair of spaced elements, a selector for each member having cam faces movable from and to a position between the spaced elements of its respective rock member and when fully between said elements bridging the same and holding the corresponding member against rocking, a rock shaft to which said selectors are secured, and means for rocking said shaft to bring selected pairs of cam faces into angular positions to co-act with said rock members and for moving said rock shaft axially to move the selected cam faces into or out of element-bridging positions.

11. In combination, a plurality of shafts, gears on said shafts, certain of said gears being slidable on said shafts for selective intermeshing with gears on the other of said shafts, shift rods movable substantially parallel to the sliding motion of said sliding gears, operative connections between said rods and gears, a rock member having a portion operatively engaging each of said rods, each of said rock members having a pair of spaced elements, a selector for each member having cam faces movable from and to a position between the spaced elements of its respective rock member and when fully between said elements bridging the same and holding the corresponding member against rocking, a rock shaft to which said selectors are secured, and means for rocking said shaft to bring selected pairs of cam faces into angular positions to coact with said rock members and for moving said rock shaft axially to move the selected cam faces into or out of element-bridging positions, said cam faces being so formed that as said rock shaft is moved axially toward selector position said rods are moved in timed relation to cause but one disconnection of gearing to occur at any one instant.

JOHN E. LOVELY.